(12) United States Patent
Barnett

(10) Patent No.: US 8,396,630 B2
(45) Date of Patent: Mar. 12, 2013

(54) SYSTEM AND METHOD FOR MONITORING DRIVER FATIGUE

(75) Inventor: Ralph L. Barnett, Wilmette, IL (US)

(73) Assignee: Triodyne Safety Systems, L.L.C., Northbrook, IL (US)

( * ) Notice: Subject to any disclaimer, the term of this patent is extended or adjusted under 35 U.S.C. 154(b) by 613 days.

(21) Appl. No.: 12/628,763

(22) Filed: Dec. 1, 2009

(65) Prior Publication Data

US 2010/0152974 A1    Jun. 17, 2010

Related U.S. Application Data

(60) Provisional application No. 61/118,711, filed on Dec. 1, 2008.

(51) Int. Cl.
*A01B 69/00* (2006.01)

(52) U.S. Cl. ............ 701/42; 701/41; 701/29.1; 180/6.2; 180/204

(58) Field of Classification Search .................. 701/41, 701/42, 29.1, 72; 180/24.01, 6.2, 204
See application file for complete search history.

(56) References Cited

U.S. PATENT DOCUMENTS

| | | | |
|---|---|---|---|
| 3,877,541 | A | 4/1975 | Takeuchi et al. |
| 4,017,843 | A | 4/1977 | Yanagishima |
| 4,234,051 | A | 11/1980 | Morris, Jr. |
| 4,278,969 | A | 7/1981 | Woods |
| 4,450,438 | A | 5/1984 | Seko et al. |
| 4,463,347 | A | 7/1984 | Seko et al. |
| 4,496,938 | A | 1/1985 | Seko et al. |
| 4,581,607 | A | 4/1986 | Seko et al. |
| 4,611,199 | A | 9/1986 | Seko et al. |
| 4,725,824 | A | 2/1988 | Yoshioka |
| 6,198,397 | B1 | 3/2001 | Angert et al. |
| 6,366,207 | B1 | 4/2002 | Murphy |
| 6,748,322 | B1 | 6/2004 | Fernandez |
| 7,138,923 | B2 | 11/2006 | Ferrone et al. |
| 7,427,924 | B2 | 9/2008 | Ferrone et al. |
| 7,821,421 | B2 * | 10/2010 | Tamir et al. ................... 340/901 |
| 2007/0169969 | A1 * | 7/2007 | Hummel et al. ............ 180/24.01 |

* cited by examiner

*Primary Examiner* — Gertrude Arthur Jeanglaude
(74) *Attorney, Agent, or Firm* — Pauley Petersen & Erickson

(57) ABSTRACT

An apparatus and method for monitoring driver fatigue and inattention. A device introduces a controlled disturbance requiring driver compensation into a steering system of a vehicle and monitors for an expected driver compensation in response to the disturbance. When the actual compensation does not sufficiently match the expected compensation the driver is alerted and vehicle functions can automatically be activated or reduced.

18 Claims, 2 Drawing Sheets

SYSTEM AND METHOD FOR MONITORING DRIVER FATIGUE

CROSS REFERENCE TO RELATED APPLICATION

This application claims the benefit of U.S. Provisional Patent Application Ser. No. 61/118,711, filed on 1 Dec. 2008. The co-pending Provisional Patent Application is hereby incorporated by reference herein in its entirety and is made a part hereof, including but not limited to those portions which specifically appear hereinafter.

BACKGROUND OF THE INVENTION

1. Field of the Invention

This invention relates to a driver monitoring device, system and method for determining and responding to fatigue and/or inattention of the driver.

2. Description of Related Art

The N.T.S.B. has reported statistics which indicate that 31% of all fatal-to-the-truck driver accidents occur due to fatigue/inattention and 58% of all single-vehicle large truck crashes were also fatigue related. If these numbers can be reduced, so can the number of serious and fatal accidents.

Commercial drivers drive long hours each day and up to 70 hours per week. Such driving occurs throughout all hours of a day: daylight, dusk and night. Fatigue has long been a problem for commercial drivers. Fatigue is cumulative; without proper rest periods, or "off-duty" cycles, fatigue will "accumulate" in the human body and eventually create moments when the driver has to struggle to stay awake. Once this occurs, the overall performance of the driver is greatly compromised.

The Department of Transportation, the National Transportation Safety Board as well as N.H.T.S.A. have collectively invested millions of dollars in researching driver fatigue. Statistics show that over two decades, 30% to 40% of all serious accidents involving heavy trucks are in some way related to fatigue or inattention. Since driver fatigue can only be controlled to an extent, one object of this invention is to detect when the driver is falling asleep or becomes inattentive.

Prior attempted solutions to this problem have included integrated systems that monitor the steering input behavior of the driver during a specified period of time. If the number of steering inputs falls below the expected predetermined threshold, the system activates an alarm, such as an audible alarm and/or light in the cab, waking and/or stimulating the driver. Conversely, according to one proposed solution, if the steering input exceeds an expected predetermined threshold, the system activates the alarm. According to such proposed solutions, the system can deactivate cruise control and/or activate various other systems/components connected with the system to further aid in the control of the vehicle and/or to alert nearby motorists.

SUMMARY OF THE INVENTION

A driver fatigue and inattention monitoring system as described herein monitors whether a driver is sleeping or inattentive. According to a preferred embodiment of this invention, a monitoring system produces a controlled perturbation or disturbance into the steering system of a vehicle which must be overcome by operator steering input. Failure to compensate by responsive steering will preferably initiate one or more various forms of feedback to the driver and vehicle, e.g., annunciators, vibrators, lighting displays, braking and signaling by radio and satellite.

Research indicates that as drivers begin to become inattentive or fall asleep, the amount of physical steering they do diminishes. This leads to "drifting" or lane changing that would not occur if the driver were awake and/or paying attention. Therefore, there is a direct correlation between steering behavior and driver wakefulness.

Drivers who are alert can and will compensate for steering excursions executed by their vehicle. On the other hand, operators under the influence of alcohol or certain drugs, or who fall asleep at the wheel or who are groggy, cannot compensate as responsively as normal drivers with a corrective steering wheel input. These impoverished drivers will be too out of phase with the controlled steering disturbance, and the measured magnitude of this phase shift will trigger a "wake-up call."

The general object of the invention can be attained, at least in part, through a driver fatigue monitoring system for a vehicle with a steering system. The monitoring system includes a perturbation device in combination with the steering system for imposing a controlled disturbance into the steering system. A monitoring device including sensors in sensing combination with the steering system is used to determine whether the steering system has been compensated for the imposed disturbance. The monitoring system also includes a warning device activatable by the monitoring device when the steering system has not been compensated for the imposed disturbance.

The invention also contemplates a vehicle with a driver fatigue monitoring system. The vehicle includes a steering system with a steering shaft including a steering control at a first end to rotate the steering shaft, a steering gear system attached to a second end of the steering shaft, and a linkage assembly connecting the steering gear system to a steering arm of a vehicle wheel. A perturbation device is in combination with the linkage assembly for imposing a controlled disturbance into the steering system. A monitoring device including sensors is in sensing combination with the steering system to determine whether the steering system has been compensated for the imposed perturbation. A warning device that is activatable by the monitoring device is also included, desirably within the passenger cabin of the vehicle or otherwise in the vicinity of the driver.

The invention further includes a method for monitoring driver fatigue, including: introducing a controlled disturbance requiring driver compensation into a steering system of a vehicle; monitoring for an expected driver compensation in response to the disturbance; and alerting the driver when the expected driver compensation is not detected.

A driver fatigue monitoring system as described in the specification and claims is designed to monitor whether a driver is sleeping and/or inattentive. This integrated system monitors the steering input behavior of the driver during a specified period of time, particularly in response to imposed and controlled disturbance to the ordinary steering input. If the driver does not properly compensate for such controlled disturbances, the system will provide an alert to the driver.

Furthermore, this system can deactivate cruise control and/or activate various other preprogrammed vehicle systems/components, like brake lights or hazard lights, to further aid in the control of the vehicle and to alert nearby motorists.

The subject invention is intended to be a practical for both pre- and post-production application to vehicles. Standard off-the-shelf automotive components may be used for steering perturbation and off-the-shelf electronics and linkages may be used. This makes the design cost effective and easy to maintain as no special parts must be developed or fabricated. Low cost and easy maintenance and effectiveness usually lead to market acceptance. As for the safety criteria, waking a sleeping driver will prevent accidents or allow the driver opportunity to mitigate them.

BRIEF DESCRIPTION OF THE DRAWINGS

These and other objects and features of this invention will be better understood from the following descriptions taken in conjunction with the following drawings.

DETAILED DESCRIPTION OF PREFERRED EMBODIMENTS

Figure 1:
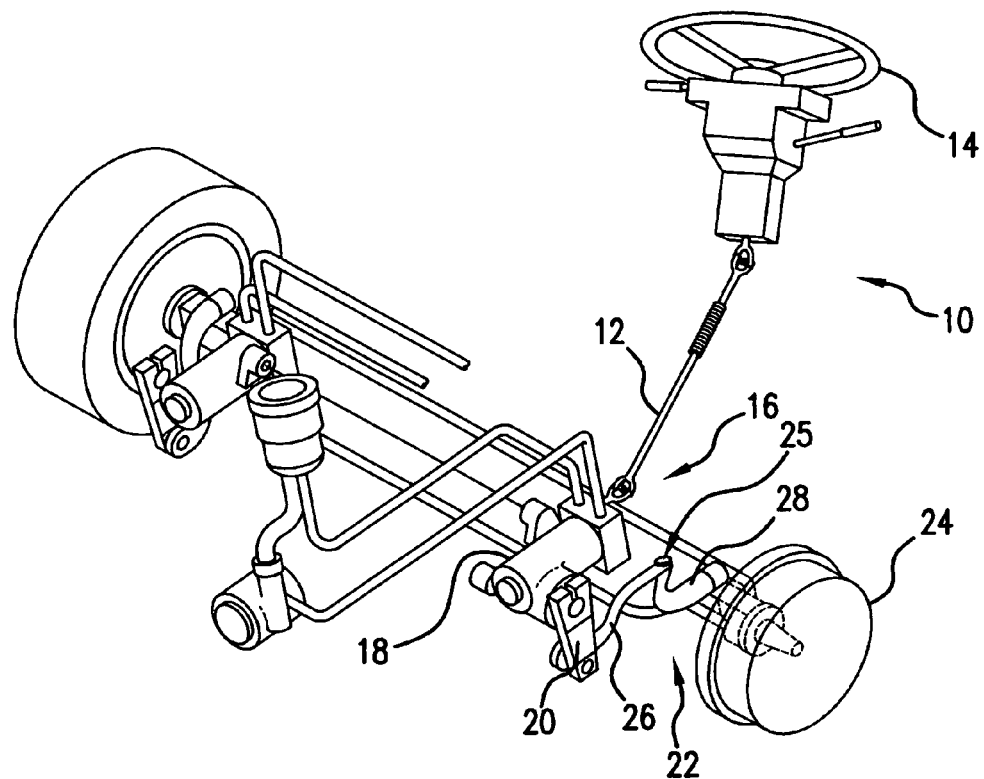
FIG. 1 is a representative schematic of an exemplary steering system.
Figure 2:
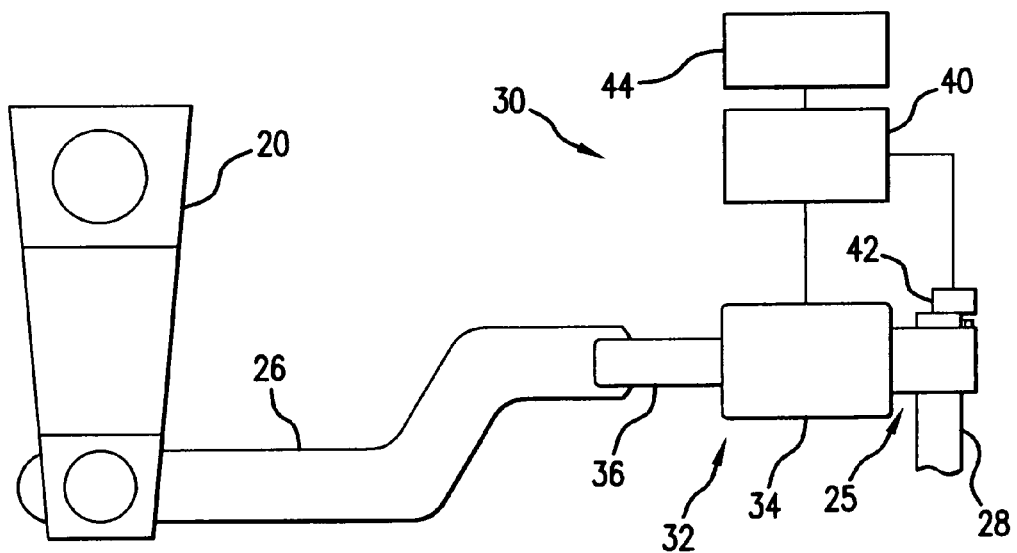
FIG. 2 is a representative schematic of an exemplary driver fatigue and inattention monitoring system according to one embodiment of this invention.

FIG. 2 shows a preferred embodiment of a driver fatigue and inattention monitoring system. The monitoring system 30 of FIG. 2 is shown as a possible implementation for the steering system shown in FIG. 1. It will be appreciated to those skilled in the art following the disclosure herein that the while the principles of the invention are disclosed in relation to particular steering systems, the invention is not limited to these or other steering systems. The principles and components of this invention can be adapted for use in various steering configurations.

FIG. 1 shows a schematic view of an exemplary and basic steering system 10 for a vehicle. "Vehicle" as used in the herein preferably includes a truck, automobile, van or similar road vehicle but may similarly include a motorcycle, boat, airplane or any other vehicle having a steering control known to those having ordinary skill in the art. The steering system 10 includes a steering shaft 12 including a steering control 14 at a first end, for use by the driver to rotate the steering shaft. "Steering control" as used herein preferably includes a steering wheel but may also include a joystick, helmswheel or similar controls known to those having ordinary skill in the art. A steering gear system 16 is attached to a second end of the steering shaft 10.

In one embodiment of this invention, the steering gear system 16 includes a steering box 18. The end of the shaft 12 has a worm gear attached to it and within the box 18. The worm gear meshes directly with a corresponding element that is connected with a pitman arm 20. The corresponding element can be any of various gear types such as, for example, a sector gear, a roller, or a recirculating ball box. When the steering wheel 14 is turned, the shaft 12 turns the worm gear, and the corresponding element pivots and turns the pitman arm. The rotational movement of the shaft 12 is thus translated to the linear motion of the pitman arm 20.

A linkage assembly 22 connects the steering gear system 16 to a steering arm of a vehicle wheel 24. The linkage assembly 22 can be formed of various and alternative components known and used in conventional vehicles, such as control links, tie rods, and/or track rods. In FIG. 1, the linkage assembly 22 includes a drag link 26 that connects to a steering arm 28 at steering knuckle 25.

As described, drivers who are alert can and will compensate for steering excursions executed by their vehicle. On the other hand, operators who are impaired, by alcohol, drugs, lack of sleep or otherwise, cannot compensate as responsively as normal drivers with a corrective steering wheel input. These impoverished drivers will be too out of phase with the controlled steering disturbances and the measured magnitude of this phase shift will trigger a "wake-up call."

According to a preferred embodiment of this invention, a linkage element, for example, downstream of the pitman arm 20 in FIG. 1, and preferably the drag link, may be designed with a perturbation device, such as a device that can shorten or lengthen the element on command. Through a control system, the length of the drag link 26 can be given a time history. For example, the drag link 26 length could be described as L+B sin $\omega$t where L is the normal drag link length in a steering system, B is the amplitude of a sine wave, $\omega$ is the frequency of the sine wave and t is time. For fixed values of B and $\omega$, the vehicle would drive in a serpentine trajectory when the steering wheel is held stationary. This sine wave driving pattern could be made speed dependent by making B=B(s) and $\omega=\omega$(s) where the argument of these two functions is speed, s.

It is apparent in FIG. 1 that a clockwise rotation of the pitman arm 20 of the correct magnitude could exactly compensate for an expanding length drag link 26. This would result in zero movement of the steering knuckle 25 and no yaw would be imposed on the wheels 24. Because the driver controls the pitman arm 20 rotation through the steering wheel 14, it is possible for the driver to completely compensate for any input signal put into the expanding/contracting drag link 26.

FIG. 2 shows an exemplary embodiment of a driver fatigue and inattention monitoring system installed in combination with the steering system 16 as shown in FIG. 1. The monitoring system 30 includes a perturbation device 32 in combination with the steering system 16 for imposing a controlled disturbance into the steering system 16. In one embodiment of this invention, the perturbation device is connected to a linkage element of linkage assembly connecting to a wheel of the vehicle. In the particular embodiment of FIG. 2, the perturbation device 32 is connected to or between the drag link 26 and the steering knuckle 25. The drag link 26 shown in FIG. 1 can be modified or replaced with a shortened drag link 26 as shown in FIG. 2 to accommodate the length of the added perturbation device 32.

In the embodiment shown in FIG. 2, the perturbation device 32 actuates to introduced a controlled disturbance into the steering system 16 to lengthen or shorten the linkage assembly, and more particularly to add length to or shorten the drag link 26. In one embodiment of this invention the perturbation device comprises a first element movable with respect to a second element to lengthen or shorten the linkage assembly. In FIG. 2, a two-way hydraulic or pneumatic cylinder 34 is used as the perturbation device 32. A cylinder piston 36 is attached end-to-end with the drag link 26 can be extended or retracted to add length to or remove length from the drag link 26.

The monitoring system includes a controller 40 for moving the first element, the piston 36, with respect to the second element, the cylinder 34. The controller 40 desirably includes a data processor to actuate the cylinder 34 at predetermined times and/or distances traveled. When the controller 40 actuates the perturbation device 32, the extended or shortened drag link 26 causes movement of the wheels and/or pitman arm 20. An attentive driver will act on the wheel 14 to correct for the disturbance within the steering system 16. As will be appreciated, the disturbance is desirably sufficient to cause a driver correction, but not so significant so as to cause an unsafe driving condition or reaction by an alert or distracted driver.

The monitoring system includes a monitoring device. In the embodiment of FIG. 2, the monitoring device is integrated in the computer system of the controller 40. Whether integral or separate from the controller 40, the monitoring device comprises a data processor for comparing an actual compensation of the steering system 16 in response to the disturbance to an expected compensation 16. The controller/monitoring device 40 is connected to sensors in sensing combination with the steering system 16 to determine whether the steering system 16 has been compensated for the imposed disturbance. In FIG. 2, the sensors 42 are placed to monitor the movement of the steering knuckle joint 25.

A driver, no matter how skillful and active, can never achieve perfect fidelity in zeroing out the drag link perturbations. An error function can be established by measuring movement of the steering knuckle 25. Note, for example, that in perfectly straight driving, a zero movement at the steering knuckle 25 is ideal; a non-zero movement is an error.

Over time, a driver must eliminate the entire effect of the imposed drag link 26 disturbances. Further, the effect of the imposed drag link 26 disturbances on the amplitude of the vehicle's trajectory must be strictly and safely bounded or limited. The computer in the controller/monitoring device 40 evaluates the steering error of the vehicle driver and producing an error signal to a warning system. The error function represents the measured deviation from these rules accumulated by a driver in a specified time interval. If the error is too high, a warning system goes into effect. In FIG. 2, the monitoring device 40 is connected to a warning device 44 that is activatable by the monitoring device 40 when the steering system 16 has not been compensated for the imposed disturbance. In one embodiment of this invention, the warning device 44 includes an audible warning device within a passenger cabin of the vehicle that sounds an audible warning to the fatigued or inattentive driver.

The warning device may comprise an audible alarm, such as a buzzer, horn, siren or similar such audible alarm. Additionally, or in the alternative, the warning device may comprise a light, such as a warning light, a strobe, a rotating light or similar visual cue. According to a preferred embodiment of this invention, whenever the warning device is activated, the driver or operator should manually reset alarm to resume normal operation of vehicle.

According to one preferred embodiment of this invention, the system 30 or controller 40 may further include a speed control device connected with respect to the vehicle. The speed control device may include cruise control or similar device that maintains the speed of a vehicle without driver or operator input. Preferably, when the warning system is activated, a controller further disables the speed control device, thus slowing down or coasting vehicle and further alerting driver regarding inattention and/or fatigue.

The system 30 of this invention can also automatically take action to deactivate cruise control and/or activate various other preprogrammed vehicle systems/components, like brake lights or hazard lights, to further aid in the control of the vehicle and to alert nearby motorists. The system 30 or controller 40 may further include a limiter connected with respect to the warning system so that, following a predetermined number of warning system activations, the limiter reduces the performance of the vehicle, such as by shutting down cylinders in the engine, adjusting parameters within the engine management software, and/or other operation which results in a reduction of performance, particularly speed and acceleration capabilities, of the vehicle. In addition, the limiter may work with engine management software to sequentially reduce vehicle power and/or performance as warning system is activated.

Figure 3:
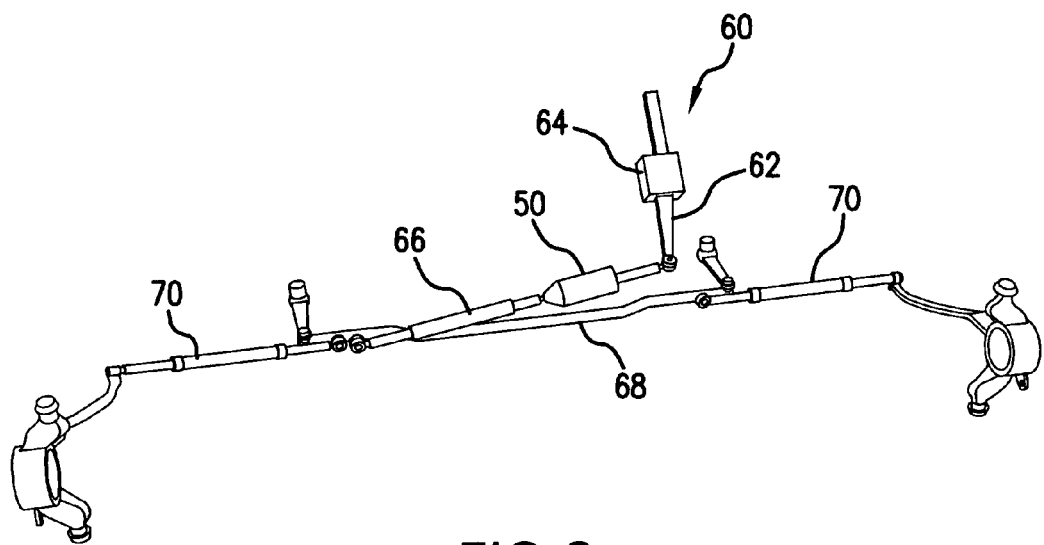
FIGS. 3 and 4 show other possible implementations of the driver fatigue and inattention monitoring system into steering systems.

While the invention has been described above with reference to a particular steering system, it should be apparent to those skilled in the art that the principles and components of this invention can be implemented in various other steering systems as well. FIG. 3 shows a perturbation device 50 in combination with a steering system 60 for imposing a controlled disturbance into the steering system 60. The steering system 60 includes a pitman arm 62 in a differently configured steering system than shown in FIG. 1. The pitman arm 62 extends between and connects a steering box 64 and a drag link 66. In this embodiment, the drag link 66 connects to a track rod 68, which has a tie rod 70 at each end. The drag link 66 includes or is shortened by the perturbation device 50, which is a hydraulic or pneumatic cylinder. The perturbation device 50 operates as discussed above to lengthen or shorten the drag link 66, thereby moving the steering system 60, and more particularly the rods 68 and 70, to introduce a disturbance to the system that requires driver compensation.

Figure 4:
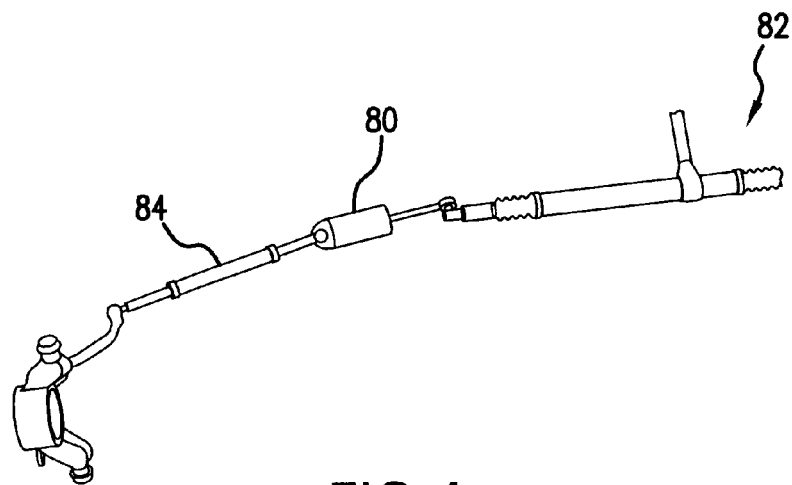

The driver fatigue and inattention monitoring system of this invention can also be implemented in different types of steering systems. FIG. 4 illustrates a perturbation device 80 connected between a rack and pinion steering device 82 and a tie rod 84. The hydraulic cylinder of the perturbation device 80 can lengthen or shorten the linkage assembly to introduce a disturbance to the steering wheel through the steering system 82.

The invention further includes a method for monitoring driver fatigue. The method includes the steps of introducing a controlled disturbance requiring driver compensation into a steering system of a vehicle, monitoring for an expected driver compensation in response to the disturbance, and alerting the driver when the expected driver compensation is not detected. The controlled disturbance can be introduced by temporarily lengthening or shortening a linkage assembly of the steering system, such as using the system discussed above. Desirably, multiple instances of the controlled disturbances are introduced into the steering system of a vehicle at a predetermined spacing. For example, a disturbance is introduced and if the driver sufficiently compensates for the disturbance, the disturbance is removed and introduced again after the predetermined or random interval.

In one embodiment of this invention, the driver compensation of the controlled disturbance is monitored by sensing movement of a joint in a vehicle copy linkage assembly. The actual driver compensation, or lack thereof, is evaluated by comparing the compensation against the expected compensation to determine a driver steering error. When the expected driver compensation is not detected and a steering error is determined, the system emits a warning to the driver and/or automatically effects vehicle functions in order to reduce the possibility or severity of a vehicle accident.

Thus the invention provides a driver fatigue and inattention monitoring system that monitors whether a driver is sleeping or inattentive. By introducing a controlled perturbation or disturbance into the steering system of a vehicle and monitoring for corrective operator steering input, an inattentive driver can be determined and one or more various forms of feedback to the driver and vehicle can be provided.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A driver fatigue and inattention monitoring system for a vehicle with a steering system, comprising:
   a perturbation device in combination with the steering system for imposing a controlled disturbance into the steering system;
   a controller actuating the perturbation device at one of a predetermined time and a distance traveled;
   a monitoring device including sensors in sensing combination with the steering system, wherein the monitoring device determines whether a driver input has compensated for the imposed disturbance; and
   a warning device activatable by the monitoring device when the driver input has not compensated for the imposed disturbance.

2. The monitoring system according to claim 1, wherein the perturbation device is connected to a linkage element of the steering system.

3. The monitoring system according to claim 1, wherein a linkage assembly connecting to a wheel of the vehicle comprises the perturbation device.

4. The monitoring system according to claim 3, wherein the perturbation device comprises a first element movable with respect to a second element to lengthen or shorten the linkage assembly.

5. The monitoring system according to claim 4, wherein the perturbation device comprises a hydraulic or pneumatic cylinder.

6. The monitoring system according to claim 1, wherein the monitoring device comprises a data processor for comparing an actual compensation of the steering system to an expected compensation.

7. The monitoring system according to claim 1, wherein the warning device comprises an audible warning device within a passenger cabin of the vehicle.

8. The monitoring system according to claim 1, wherein the vehicle includes a steering shaft connected to a steering gear system and a linkage assembly connecting the steering gear system to a steering arm of a wheel of the vehicle, and further comprising:
   a hydraulic or pneumatic cylinder including a movable piston in combination with the linkage assembly; and
   a control device for moving the piston during use of the vehicle to lengthen or shorten the linkage assembly, thereby introducing the controlled disturbance.

9. A vehicle with a driver fatigue and inattention monitoring system, comprising:
   a steering shaft including a steering control at a first end to rotate the steering shaft;
   a steering gear system attached to a second end of the steering shaft;
   a linkage assembly connecting the steering gear system to a steering arm of a vehicle wheel;
   a perturbation device in combination with the linkage assembly for imposing a controlled disturbance into the steering system;
   a controller actuating the perturbation device at one of a predetermined time and a distance traveled;
   a monitoring device including sensors in sensing combination with the steering system, wherein the monitoring device determines whether a driver input has compensated for the imposed perturbation; and
   a warning device activatable by the monitoring device.

10. The vehicle according to claim 9, wherein the perturbation device comprises a first element movable with respect to a second element to lengthen or shorten the linkage assembly during vehicle use.

11. The vehicle according to claim 10, wherein the perturbation device comprises a hydraulic or pneumatic cylinder.

12. The vehicle according to claim 9, wherein further comprising a hydraulic or pneumatic cylinder connected to a drag link between the vehicle wheel and a pitman arm of the steering gear system.

13. A method for monitoring driver fatigue and inattention, comprising:
   introducing a controlled disturbance requiring driver compensation into a steering system of a vehicle with a perturbation device at one of a predetermined time and distance traveled;
   monitoring for an expected driver compensation in response to the introduced controlled disturbance; and
   alerting the driver when the expected driver compensation is not detected.

14. The method according to claim 13, wherein introducing the controlled disturbance comprises temporarily lengthening or shortening a linkage assembly of the steering system.

15. The method according to claim 13, further comprising introducing a plurality of controlled disturbances into the steering system of a vehicle, each of the plurality of controlled disturbances introduced at a predetermined spacing from an other of the plurality of controlled disturbances.

16. The method according to claim 13, wherein monitoring for the driver compensation of the disturbance comprises sensing movement of a joint in the linkage assembly.

17. The method according to claim 16, further comprising evaluating the driver compensation against the expected compensation to determine a driver steering error.

18. The method according to claim 13, further comprising automatically effecting vehicle functions when the expected driver compensation is not detected.

* * * * *